(12) United States Patent
Van Minnebruggen

(10) Patent No.: US 10,322,369 B2
(45) Date of Patent: Jun. 18, 2019

(54) DRYER FOR COMPRESSED GAS, COMPRESSOR INSTALLATION EQUIPPED WITH A DRYER AND METHOD FOR DRYING GAS

(71) Applicant: ATLAS COPCO AIRPOWER, NAAMLOZE VENNOOTSCHAP, Wilrijk (BE)

(72) Inventor: Ewan Van Minnebruggen, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 0 days.

(21) Appl. No.: 16/150,540

(22) Filed: Oct. 3, 2018

(65) Prior Publication Data

US 2019/0030483 A1     Jan. 31, 2019

Related U.S. Application Data

(62) Division of application No. 15/022,693, filed as application No. PCT/BE2014/000048 on Sep. 16, 2014.

(Continued)

(30) Foreign Application Priority Data

Sep. 18, 2013 (BE) .................................. 2013/0624
Aug. 19, 2014 (BE) .................................. 2014/0621

(51) Int. Cl.
    *B01D 53/02*     (2006.01)
    *B01D 53/26*     (2006.01)
(Continued)

(52) U.S. Cl.
    CPC ........... *B01D 53/261* (2013.01); *B01D 53/06* (2013.01); *F04B 39/16* (2013.01); *B01D 53/265* (2013.01);
(Continued)

(58) Field of Classification Search
    CPC ........ B01D 2251/402; B01D 2251/404; B01D 2251/406; B01D 2253/108;
(Continued)

(56) References Cited

U.S. PATENT DOCUMENTS 3,490,201 A    1/1970   Colvin et al.
4,269,611 A    5/1981   Anderberg
(Continued)

FOREIGN PATENT DOCUMENTS

EP      0566180 A1    10/1993
EP      0803685 A1    10/1997
(Continued)

OTHER PUBLICATIONS

International Search Report from PCT Application No. PCT/BE2014/000048, dated Aug. 31, 2015.

*Primary Examiner* — Christopher P Jones
(74) *Attorney, Agent, or Firm* — Workman Nydegger

(57) ABSTRACT

A dryer is provided with a pressure vessel with a drying zone and regeneration zone. The regeneration zone comprises a first subzone and a second subzone. The dryer comprises a rotatable drum in the pressure vessel with a drying agent, and the outlet of the regeneration zone is connected to the drying zone via a connecting pipe with a cooler and condensate separator. A tap.-off pipe is connected to the outlet of the drying zone and is also connected to the inlet of the second subzone. A blower is provided to realize a regeneration flow from the drying zone to the second subzone.

18 Claims, 9 Drawing Sheets

Related U.S. Application Data

(60) Provisional application No. 61/941,561, filed on Feb. 19, 2014.

(51) Int. Cl.
*B01D 53/06* (2006.01)
*F04B 39/16* (2006.01)

(52) U.S. Cl.
CPC .. *B01D 2257/80* (2013.01); *B01D 2259/4009* (2013.01)

(58) Field of Classification Search
CPC ........ B01D 2253/206; B01D 2257/504; B01D 53/12; B01D 53/62; B01D 53/78; B01D 53/83; B01D 53/96; B01J 39/02; B01J 39/04; B01J 39/14; B01J 39/18; B01J 47/02
See application file for complete search history.

(56) References Cited

U.S. PATENT DOCUMENTS

| | | | |
|---|---|---|---|
| 4,926,618 A | 5/1990 | Ratliff | |
| 5,385,603 A | 1/1995 | Sienack | |
| 6,294,000 B1 | 9/2001 | Klobucar | |
| 6,375,722 B1 | 4/2002 | Henderson et al. | |
| 2005/0268635 A1 | 12/2005 | Moffitt | |
| 2011/0132191 A1* | 6/2011 | Fredenhagen | B01D 53/06 95/14 |
| 2012/0118152 A1* | 5/2012 | Vermeer | B01D 53/06 95/113 |

FOREIGN PATENT DOCUMENTS

| | | |
|---|---|---|
| GB | 1226348 A | 3/1971 |
| GB | 1349732 A | 4/1974 |
| GB | 1426292 A | 2/1976 |
| JP | H05115736 A | 5/1993 |
| JP | H06343819 A | 12/1994 |
| JP | H10305208 A | 11/1998 |
| JP | 2001179034 A | 7/2001 |
| JP | 2001179036 A | 7/2001 |
| WO | 0033943 A1 | 6/2000 |
| WO | 0074819 A1 | 12/2000 |
| WO | 0178872 A2 | 10/2001 |
| WO | 2001087463 A1 | 11/2001 |
| WO | 0238251 A1 | 5/2002 |
| WO | 2005070518 A1 | 8/2005 |
| WO | 2006012711 A1 | 2/2006 |
| WO | 2007079553 A1 | 7/2007 |
| WO | 2008044932 A1 | 4/2008 |
| WO | 2011017782 A1 | 2/2011 |
| WO | 2011017784 A1 | 2/2011 |

* cited by examiner

DRYER FOR COMPRESSED GAS, COMPRESSOR INSTALLATION EQUIPPED WITH A DRYER AND METHOD FOR DRYING GAS

BACKGROUND

The present invention relates to a dryer for compressed gas and to a compressor installation and a method for drying gas.

Dryers for compressed gas are already known, which dryers are provided with a vessel containing a drying zone and a regeneration zone, and possibly a cooling zone; a first inlet to the drying zone for the supply of the compressed gas to be dried and a first outlet from the drying zone for the removal of dried gas; a second inlet to the regeneration zone for the supply of a warm regeneration gas and a second outlet from the regeneration zone and the optional cooling zone; a rotatable drum in the vessel with a regenerable drying agent therein and drive means for rotating said drum such that the drying agent is moved successively through the drying zone and the regeneration zone, whereby said second outlet of the regeneration zone and the optional cooling zone is connected to said first inlet of the drying zone by means of a connecting pipe with a cooler and condensate separator therein, and whereby said dryers are configured such that, during the operation of the dryer, the gas flow rate leaving the regeneration zone and the possible cooling zone via the second outlet is equal or almost equal to the gas flow rate that is subsequently guided via the first inlet into the drying zone to be dried.

An example of a dryer in which the regeneration gas flow rate leaving the regeneration zone corresponds to the flow rate of gas to be dried that is guided into the drying zone is described in WO 01/87463. The warm compressed gas is first guided through the regeneration zone where it acts as a regeneration gas and absorbs moisture from the drying agent for the regeneration of this drying agent. In the embodiment described in WO 01/87463, ambient air is compressed for example, for example by means of an air compressor, and this air not only undergoes a pressure increase during compression but also experiences a temperature increase, such that the relative humidity of this air falls and this air is able to absorb moisture from the drying agent. Dryers that make use of the heat of compression present in the compressed regeneration gas are also known in industry by the name 'heat of compression' dryers or HOC dryers.

After passing through the regeneration zone the warm regeneration gas presents a higher relative humidity. The moist gas leaving the regeneration zone is then guided through a cooler in the connecting pipe such that the temperature of this gas falls to below the pressure dew point and condensation of the moisture in the gas occurs. The droplets thereby formed are then removed by means of the condensate separator such that the now cooled compressed gas is 100% saturated and is guided in its entirety to the first inlet of the drying zone and then through this drying zone, where the drying agent extracts moisture from this compressed gas by means of sorption (adsorption and/or absorption). The dried gas leaving the drying zone can be used in a compressed air network located downstream of the dryer for all kinds of purposes, such as pneumatic transport, driving pneumatically powered tools, and similar.

It is characteristic of the type of dryer described above in WO 01/87463 that the full or practically full flow of compressed gas originating from the compressor is first guided through the regeneration zone, and then fully through the drying zone. Dryers that make use of such a full flow of the gas through the regeneration zone and the drying zone are also called full-flow dryers.

In other arrangements, for example as described in WO 2006/012711, the bulk of the warm compressed gas leaving the compressor is first guided through an 'aftercooler' to then be guided to the drying zone. Only a portion of the warm compressed gas is tapped off downstream from the compressor and upstream from the aftercooler in order to be guided to the regeneration zone for regeneration of the drying agent. Such a dryer as described in WO 2006/012711 is thus a heat-of-compression dryer, but does not operate according to the full-flow principle, as it is not the entire flow of warm compressed gas that is used as a regeneration gas.

WO 2011/017782 also describes a heat-of-compression dryer that does not operate according to the aforementioned full-flow principle. The dryer as described in WO 2011/017782 presents the particular characteristic that the regeneration zone comprises two subzones, i.e. a first subzone through which a first regeneration flow is guided and a second subzone through which a second regeneration flow is guided, and whereby the dryer is configured such that the relative humidity of the aforementioned second regeneration flow is lower than the relative humidity of the aforementioned first regeneration flow that is guided through the first subzone. The second subzone is preferably at the end of the regeneration zone. In this way more moisture can be absorbed from the drying agent than in a conventional way, such that more moisture can then be sorbed by the drying agent from the gas to be dried in the drying zone.

With such a dryer according to WO 2011/017782 it may be that in certain circumstances, for example when starting a compressor that supplies a gas to be dried to the dryer, the desired flow of the second regeneration flow cannot be realised as the pressure in the drying zone has not built up sufficiently. In some cases gas from the regeneration zone can even temporarily enter the outlet of the drying zone through any leaks or even the tap-off pipe, which could result in undesired dew point peaks. The aim of the present invention is to avoid this in as many possible circumstances.

SUMMARY

The present invention concerns an improved dryer that provides optimum performance with regard to energy consumption and with regard to dryer efficiency, by making optimum use of the intrinsic heat in the compressed gas supplied, and also by obtaining deep drying of the drying agent such that the relative humidity of the compressed gas leaving the dryer can be made as low as possible. In addition, the invention is aimed at being able to guarantee the high dryer efficiency in the most optimum way in as many possible conditions of use, and also at avoiding dew point peaks when starting up the system.

To this end the present invention concerns a dryer for compressed gas, and this dryer is provided with a vessel containing a drying zone and regeneration zone; a first inlet to the drying zone for the supply of a warm, compressed gas to be dried and a first outlet from the drying zone for the removal of dried gas; whereby the aforementioned regeneration zone comprises a first subzone with a first inlet for a first regeneration flow and a second subzone with a second inlet for a second regeneration flow and whereby the regeneration zone is further provided with a second outlet for the regeneration flows from the first and second subzones; whereby the dryer is further provided with a rotatable drum in the said vessel with a regeneratable drying agent therein and drive means for rotating the aforementioned drum such that the drying agent can be moved successively through the drying zone and the regeneration zone, whereby the aforementioned second outlet of the regeneration zone is connected to the aforementioned first inlet of the drying zone by means of a connecting pipe with a cooler and condensate separator therein, whereby a first end of a tap-off pipe is connected to the first outlet of the drying zone and its other end is connected to the aforementioned second inlet of the second subzone; whereby the dryer is configured such that the entire flow rate of gas to be dried is first guided through the regeneration zone before being guided through the drying zone; and whereby means are provided to boost said second regeneration flow from the drying zone, through the tap-off pipe, to the second subzone, and these means comprise a blower in said connecting pipe.

With a "blower" is meant here a device that is configured to (actively) increase the pressure of a gas or a mixture of gasses such as air, for example a compressor. With the expression "increase the pressure" is meant that the pressure at the outlet side of the blower is higher than on the inlet side of this blower, when the blower is operating. A venture ejector, in this context, is not regarded as a blower.

The "connecting pipe" according to the invention can be realized in different ways, and is configured so as allow to channel a flow, for example in the form of a pipe construction or another form of canalisation that might or might not be integrated.

With the expression "in said connecting pipe" is meant that the blower is configured such that is able to boost the gas flow through this connecting pipe.

Due to the presence of said means for boosting the second regeneration flow, it is ensured that very dry gas is always supplied from the outlet of the drying zone to the second subzone for a deep drying operation of the drying agent. The operational reliability and high dryer efficiency can thus be ensured.

In addition to achieving the said objective of ensuring the high efficiency in different conditions, the specific location of the means for realizing the second regeneration flow also leads to the possibility to set the pressure at the first outlet of the drying zone higher than the pressure at the first inlet of the first subzone of the regeneration zone, such that this prevents moist gas from the inlet of the first subzone of the regeneration zone being able to move via any leaks to the outlet of the drying zone and thus negatively affecting the level of humidity of the dried gas.

According to a preferred characteristic the aforementioned second subzone is at the end of the regeneration zone, or in other words at the side of the regeneration zone along which the drying agent, during rotation of the drum, leaves the regeneration zone to again go into the drying zone.

According to a particular embodiment, the aforementioned blower is equipped with controllable drive means that are connected to a control system to which one or more sensors are connected to determine the pressure difference between the outlet of the drying zone and the inlet of the first subzone of the regeneration zone, and whereby the aforementioned control system is provided with an algorithm that controls the speed of the aforementioned drive means on the basis of the aforementioned pressure difference.

In this way an active continuous control can be applied that prevents moist gas getting into the outlet of the drying zone under all conditions. A further increase of the reliability of the dryer can thus be obtained.

According to a particular characteristic of the invention the dryer is further provided with restriction means that prevent gas from the drying zone being able to flow to the regeneration zone via the connecting pipe. According to one embodiment, such restriction means can comprise a non-return valve that is affixed in the aforementioned connecting pipe and which is configured such that it only allows a gas flow from the regeneration zone to the drying zone and not vice versa.

In this way it can be ensured that, even when the dryer is not operating because no gas to be dried is being supplied, the drying zone can be kept at pressure, at least for a certain time, and also when restarting the dryer the aforementioned pressure difference is present or can at least be reached more quickly.

According to a preferred characteristic of the invention a heating element ('heater') is provided in the aforementioned tap-off pipe. The aforementioned heating element can be made controllable if need be. This means that the temperature of the heating element can be made controllable by providing control means that can be operated either manually or by means of a control unit, or in both ways. Possibly the heating element can be provided with a temperature sensor for measuring the temperature in the heating element, which temperature sensor, for example, can be connected to said control unit, so as to be able to strive towards a set-value of temperature, for example by means of a PID-regulation, by comparing the measured temperature value with such a set-value and subsequently, either manually, or in an automated fashion by means of such a control unit, adjusting the temperature in the heating element in a suitable manner.

The presence of the heating element enables the relative humidity of the second regeneration flow to be further decreased, such that deeper drying of the drying agent can be realised.

The present invention also relates to a compressor installation equipped with a compressor with an inlet for gas to be compressed and a pressure pipe for compressed gas, and this pressure pipe is connected to a first inlet of a first subzone of a regeneration zone of a dryer for the supply of a warm, first regeneration flow to this first subzone, whereby the dryer comprises a vessel with the aforementioned regeneration zone and a drying zone therein; whereby this dryer is further provided with a first inlet of the drying zone and a first outlet of the drying zone, a second subzone of the regeneration zone with a second inlet and a second outlet of the regeneration zone; whereby a rotatable drum is provided in the vessel with a regeneratable drying agent therein and drive means for rotating the aforementioned drum so that the drying agent moves successively through the drying zone and the regeneration zone; whereby the aforementioned second outlet of the regeneration zone is connected by means of a connecting pipe with a cooler and condensate separator therein to the aforementioned first inlet of the drying zone; whereby the first outlet of the drying zone is connected to the aforementioned second inlet of the second subzone via a tap-off pipe for the supply of a second regeneration flow; whereby the compressor installation is configured such that the entire flow rate of warm, compressed gas to be dried coming from the compressor, is first guided regeneration zone, before being guided through the drying zone; and whereby means are provided for boosting said second regeneration flow from the drying zone, through the tap-off pipe, to the second subzone and these means comprise a blower in said connecting pipe.

Such a compressor installation presents the advantages described above of high reliability, optimisation of deep drying of the drying agent, and energy-saving measures by applying the full-flow principle.

The dryer that forms part of a compressor installation according to the invention can be constructed in many ways and may or may not present the preferred characteristics already described above with the resulting accompanying advantages.

In a particular embodiment of a compressor installation according to the invention, no tap-off pipe is connected to the aforementioned pressure pipe.

According to a specific aspect of the invention, the aforementioned blower is equipped with a controllable drive, for example in the form of a frequency controlled motor. According to a specific aspect of the invention the compressor for the supply of gas to be dried can be equipped with a controllable drive, for example in the form of a frequency controlled motor. In the case where both the compressor and the blower are equipped with such a controllable drive, it is preferable to provide both with a common control system. The aforementioned control system can be provided with an algorithm that stops the blower when the compressor stops. If necessary, restriction means can also be provided that prevent gas being able to flow from the drying zone to the regeneration zone via the connecting pipe.

According to a specific embodiment, such restriction means can comprise a controllable shutoff valve that is connected to the aforementioned control system or otherwise for the control of this shutoff valve.

The present invention also relates to a method for drying compressed gas, whereby this method comprises the following steps:
- driving the entire warm compressed gas flow originating from a compressor through a first subzone of the regeneration zone of a dryer that is provided with a vessel, with the aforementioned regeneration zone and a drying zone therein, and a rotatable drum in the vessel with a regeneratable drying agent therein and drive means for rotating the aforementioned drum such that the drying agent is moved successively through the drying zone and the regeneration zone;
- then the cooling of the aforementioned gas flow, after passing through the aforementioned regeneration zone, and the separation of the condensate from this gas flow;
- then guiding the gas flow concerned through the aforementioned drying zone to dry this gas flow for use in further applications;
- guiding a second regeneration flow through a second subzone of the regeneration zone whose relative humidity is lower than that of the first regeneration flow.

According to a preferred characteristic of the invention the second regeneration flow consists of a portion of the dried gas that is tapped from the first outlet of the drying zone and is guided back to a second inlet of the aforementioned second subzone of the regeneration zone.

A preferred characteristic of a method according to the invention of the drying gas consists of the tapped-off portion of dried gas first being heated before being guided to the second subzone of the regeneration zone.

A specific aspect of the invention consists of the gas flow that leaves the regeneration zone via the connecting pipe being subject to a pressure increase such that the pressure at the outlet of the drying zone is higher than the pressure at the inlet of the first subzone of the regeneration zone.

BRIEF DESCRIPTION OF THE DRAWINGS

With the intention of better showing the characteristics of the invention, a few preferred embodiments of a dryer and a compressor installation according to the invention, and a few preferred ways for implementing a method according to the invention for drying compressed gas, are described hereinafter by way of an example, without any limiting nature, with reference to the accompanying drawings, wherein.

DETAILED DESCRIPTION OF VARIOUS EMBODIMENTS

Figure 1:
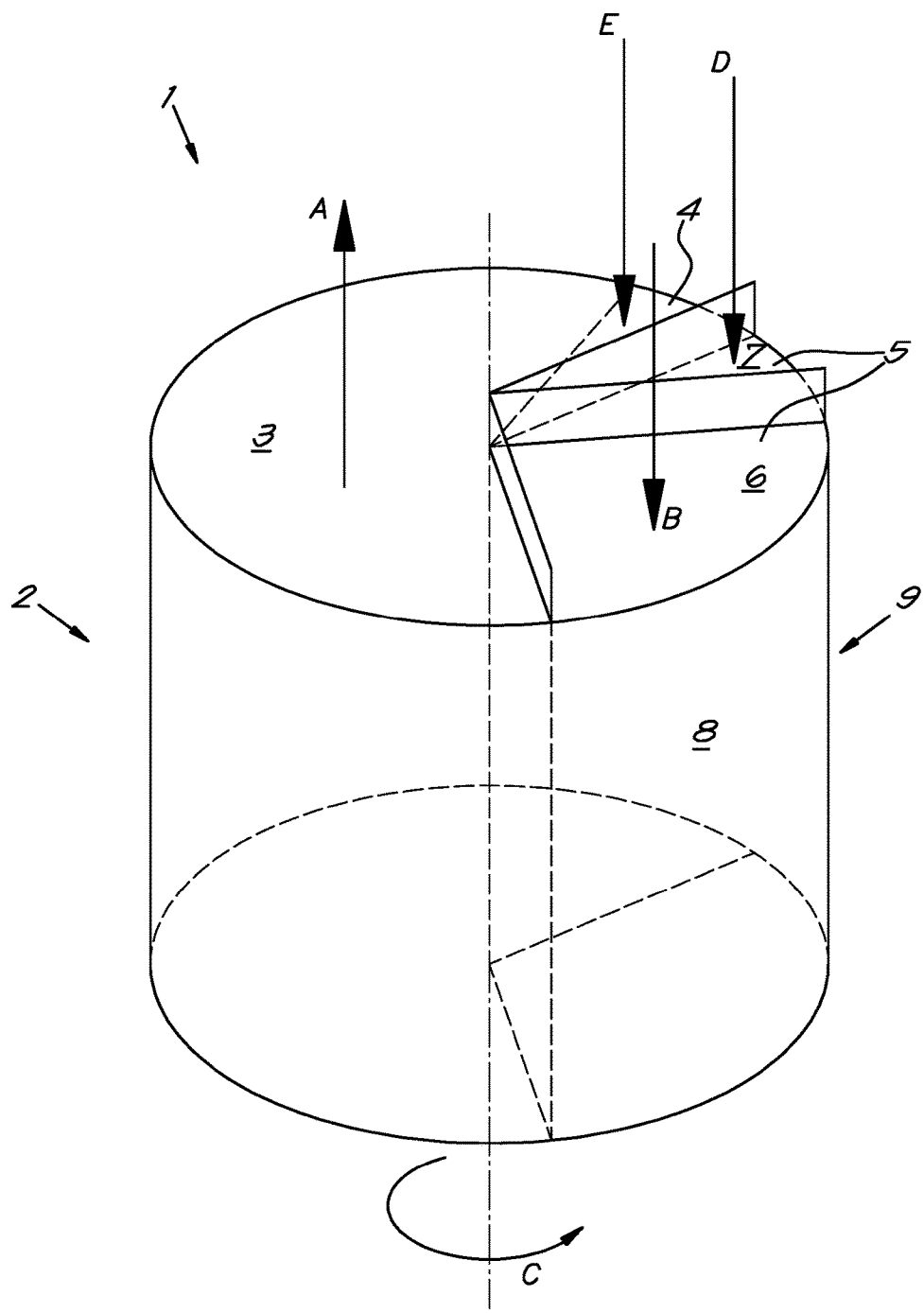
FIG. 1 schematically shows a perspective view of a section of a dryer according to the invention.

FIG. 1 shows a section 1 of a dryer according to the invention for compressed gas. The section 1 of the dryer is provided with a housing in the form of a vessel 2 containing a drying zone 3, an optional cooling zone 4 and a regeneration zone 5, which, according to a specific characteristic of the invention, comprises two subzones 6 and 7, respectively a first subzone 6 and a second subzone 7.

The aforementioned first subzone 6 preferably connects to the end of the drying zone 3, while the second subzone 7 connects to the first subzone 6 and, in this case, but not necessarily, is followed by a cooling zone 4, which in turn connects to the start of the drying zone 3.

Hence the first subzone 6 is at the start of the regeneration zone 5, or in other words at the section of the drying zone 3 through which, during the operation of the dryer, moisture-containing drying agent 8 enters the regeneration zone, while the second subzone 7 is at the end of the regeneration zone 5, or in other words at the section of the regeneration zone through which the regenerated drying agent 8 leaves the regeneration zone 5 and enters the cooling zone 4.

The end of the drying zone 3 here means the section of the drying zone 3 through which the moisture-containing drying agent 8 leaves the drying zone 3 when the drum 9 is rotating, while the start of the drying zone 3 means the section of the drying zone 3 in which fresh regenerated drying agent 8 enters.

A rotating drum 9 is affixed in the vessel 2 in which a drying agent 8 or 'desiccant' is provided, for example in the form of silica gel, active alumina, activated carbon or another material that enables moisture to be sorbed from a gas flow.

The dryer is also equipped with drive means not shown in the drawings, for example in the form of a motor for rotating the drum 9, so that the drying agent 8 is moved successively through the drying zone 3, the regeneration zone 5 and the cooling zone 4. Said drive means can be surrounded entirely or partially by the vessel 2 of a part thereof. For example, the drive means could extend through a bottom flange of said vessel 2. The drive means might or might not allow to set the rotational speed of the drum 9 or to have this rotational speed varied.

Figure 2:
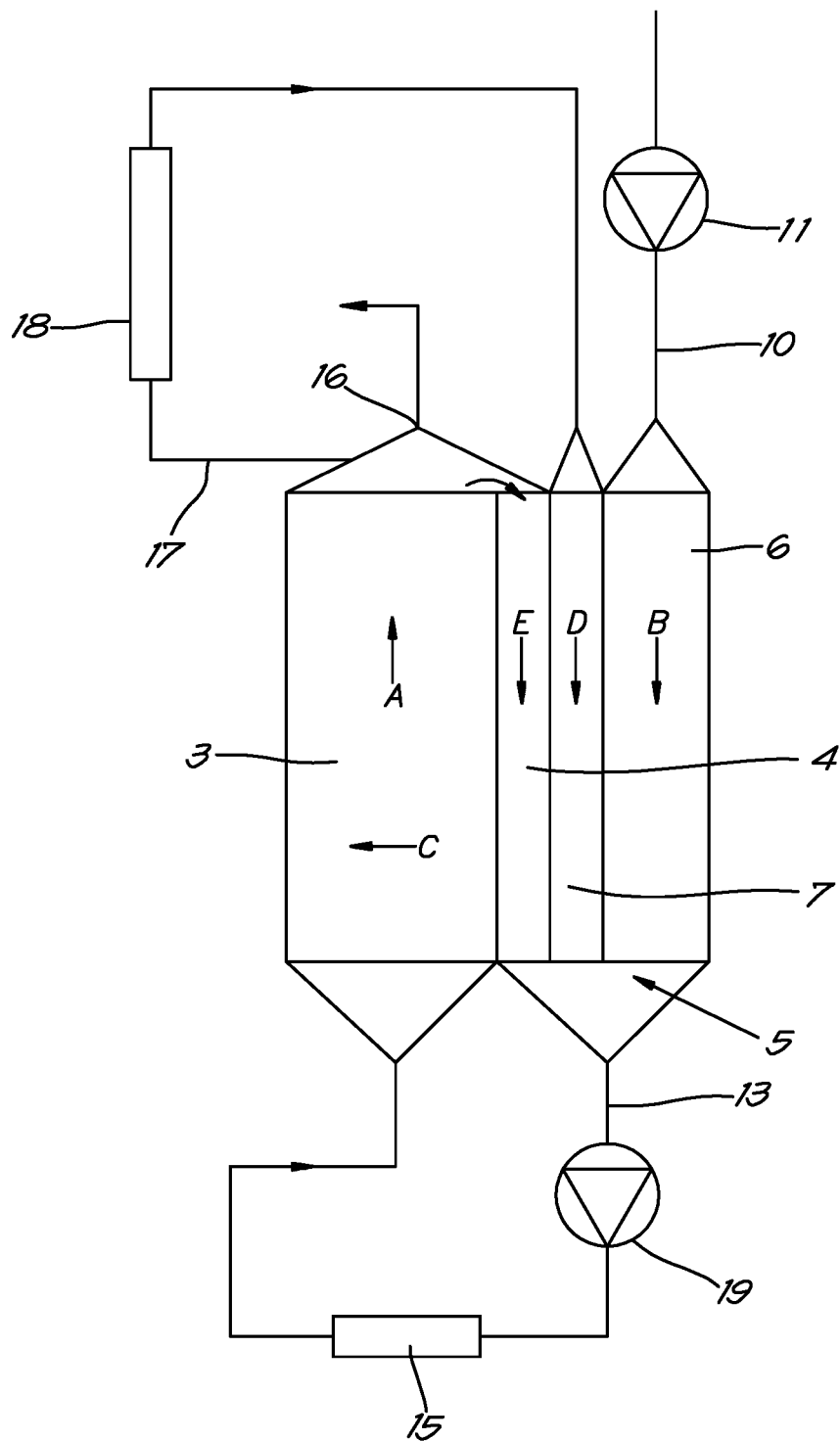
FIG. 2 schematically shows a compressor installation according to the invention.

FIG. 2 shows a compressor installation according to the invention, which, in addition to the aforementioned section 1, comprises a pressure pipe 10 that forms a connection between the outlet of a compressor 11 and an inlet of the first subzone 6. The compressor 11 also forms part of the compressor installation.

It is clear that the aforementioned compressor 11 can be of different types, for example a screw compressor or a turbo compressor that can be constructed as a multistage machine or otherwise.

According to a preferred aspect of the invention no tap-off is connected to the aforementioned pressure pipe 10 so that during operation, the entire flow of warm compressed gas originating from the compressor 11 is guided to the regeneration zone 5, and more specifically to the first subzone 6 of the regeneration zone.

Furthermore a connecting pipe 13 is provided for the gas flows, used for regeneration (and in this example also for the cooling), and this connecting pipe 13 connects the common outlet of the first and second subzones 6 and 7 of the regeneration zone 5, and in this case also the cooling zone 4, to the first inlet of the drying zone 3. In this connecting pipe 13 there is a cooler 15 and a condensate separator, whereby the said condensate separator can be integrated in the cooler 15 or otherwise.

An off-take point 16 is provided at the first outlet of the drying zone through which the dried gas can be removed for further use, and a tap-off pipe 17 is provided that drives a portion of the dried gas through an optional heating element 18 that can be affixed in the tap-off pipe 17 concerned and then guides this portion of tapped-off gas through the second subzone 7 of the regeneration zone 5. The presence of the heating element 18 is preferable for the invention but not necessary.

According to a specific aspect of the invention the dryer comprises means for realizing the second regeneration flow from the first outlet of the drying zone 3 to the second inlet of the second subzone 7 of the regeneration zone 5, and these means comprise a blower.

The operation of the compressor installation according to FIG. 2 is very simple and as follows.

The direction of the flows is indicated in the drawings. Arrow A shows the direction of flow through the drying zone 3 of the dryer. The direction of flow of the other gas flows through the regeneration and cooling zones is, in the example shown, in the opposite direction to the direction of flow A of the flow through the drying zone 3, as shown by arrows B, D and E. Arrow C indicates the direction of rotation of the drum 9 in the housing of the dryer.

The warm compressed gas to be dried originating from the compressor 11 first flows through the drying agent in the first subzone 6 of the regeneration zone 5 to the aforementioned second outlet of the regeneration zone 5. Hereby this gas acts as a first regeneration flow that absorbs moisture from the drying agent 8, making use of the heat of compression present in this first regeneration flow.

The heat in the compressed gas to be dried coming from the compressor 11 is generated during the compression of the gas to be dried by means of the compressor 11. This is in other words so-called 'heat of compression'.

At the end of the movement of the drying agent 8 through the regeneration zone 5, according to a specific characteristic of the invention this drying agent 8 in the second subzone 7 of the regeneration zone 5, is further dried by bringing the drying agent 8 into contact with a second regeneration flow whose relative humidity is lower than that of the first regeneration gas flow.

To this end in this case the second regeneration gas flow consists of gas that is tapped off from the dried gas leaving the drying zone 3, and in this example, but not necessarily, before being guided via the second inlet of the second subzone 7 in the regeneration zone 5, is guided through the heating element 18, in which this gas flow is heated, in order to reduce the partial pressure of any water still present in this gas.

It is clear that in this way the moisture content of the drying agent 8 can be substantially reduced during regeneration because the drying agent 8 in the second subzone 7 of the regeneration zone 5 is post-dried by making use of a warm dry gas with a very low relative humidity.

As the drum 9 turns further, more and more moisture is extracted from the drying agent 8 until the drying agent 8 reaches the drying zone 3, in this case after having first been cooled in the cooling zone 4, stripped of the adsorbed moisture, so that the thus regenerated drying agent 8 can be used for drying in the drying zone 3.

The gas that enters the connecting pipe 13 via the second outlet of the regeneration zone 5 is cooled by means of a cooler 15. The condensate hereby formed is removed by means of a condensate separator (that can be integrated in the cooler 15). The 100% saturated gas is then carried through the drying zone where it is dried by means of the drying agent 8. The thus dried gas is removed via an off-take point 16 to a consumer network located downstream.

In the manner described above, the drying agent 8 is alternately guided through the drying zone 3 and then through the regeneration zone 5 in a continuous or discontinuous rotation movement.

It is possible for the invention that a portion of the dried gas flow is used to cool the warm regenerated drying agent 8 in the transition between the regeneration zone 5 and the drying zone 3 in the cooling zone 4, before the aforementioned drying agent 8 comes into contact with the main flow in the drying zone 3.

The presence of such a preferred and beneficial cooling zone 4 leads to an optimisation of the drying because warm drying agent 8 is not able to adsorb moisture, which leads to moist gas being able to leak through the dryer 1. This is thus prevented by the use of such a cooling zone 4.

Figure 3:
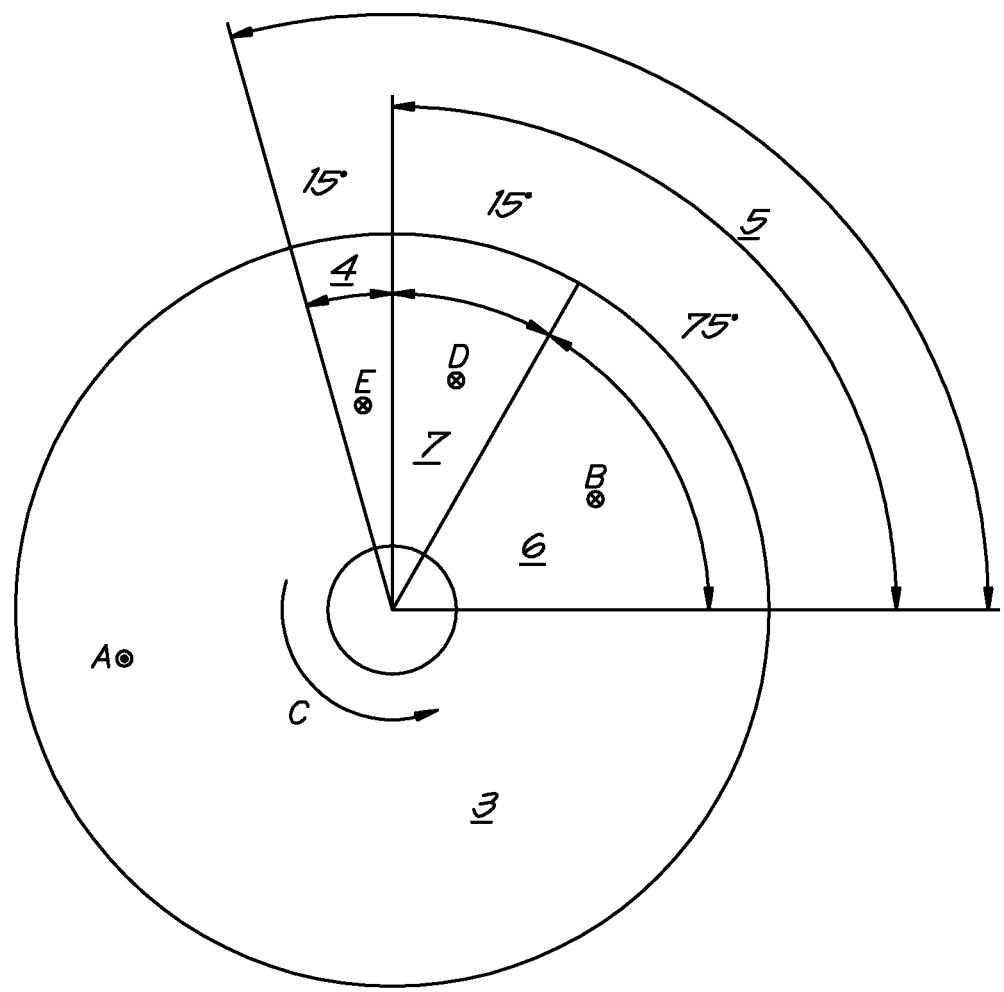
FIG. 3 schematically shows the layout of a section of a dryer according to the invention.

FIG. 3 shows an example of a schematic division of a section 1 of a dryer according to the invention, whereby the various sectors or zones can be seen.

In particular this drawing shows how the regeneration zone 5 is divided into two subzones 6 and 7, whereby in this case the regeneration zone 5 extends over an inscribed angle of almost 90 degrees.

The first subzone 6, in this example, extends over an angle of 75 degrees, while the second subzone 7 in this example extends over an angle in a range from 5 degrees to 30 degrees, and in this case over an angle of almost 15 degrees.

In this example the drying zone comprises a sector of 255 degrees, while the remaining part of 15 degrees, between the second subzone 7 and the drying zone 3, constitutes the cooling zone 4 in the cylindrical housing 2 of the dryer. The aforementioned angles are merely stated as an example and are by no means restrictive for the scope of protection of the invention. Indeed other angles can also be used.

The drawing shows in what direction the various zones preferably turn in the drum 9.

Due to the presence of the aforementioned means for realizing the second regeneration flow, not only are the operational reliability and the dryer efficiency increased, but these means also ensure that the pressure at the outlet of the drying zone 3 can be kept higher than at the first inlet of the first subzone 6 of the regeneration zone 5, such that the occurrence of any undesired leaks from the moist side (the first inlet of the first subzone 6) to the dry side (the first outlet of the drying zone 3), and thus the occurrence of contamination of the dried gas flow, is minimized or even ruled out.

Figure 4:
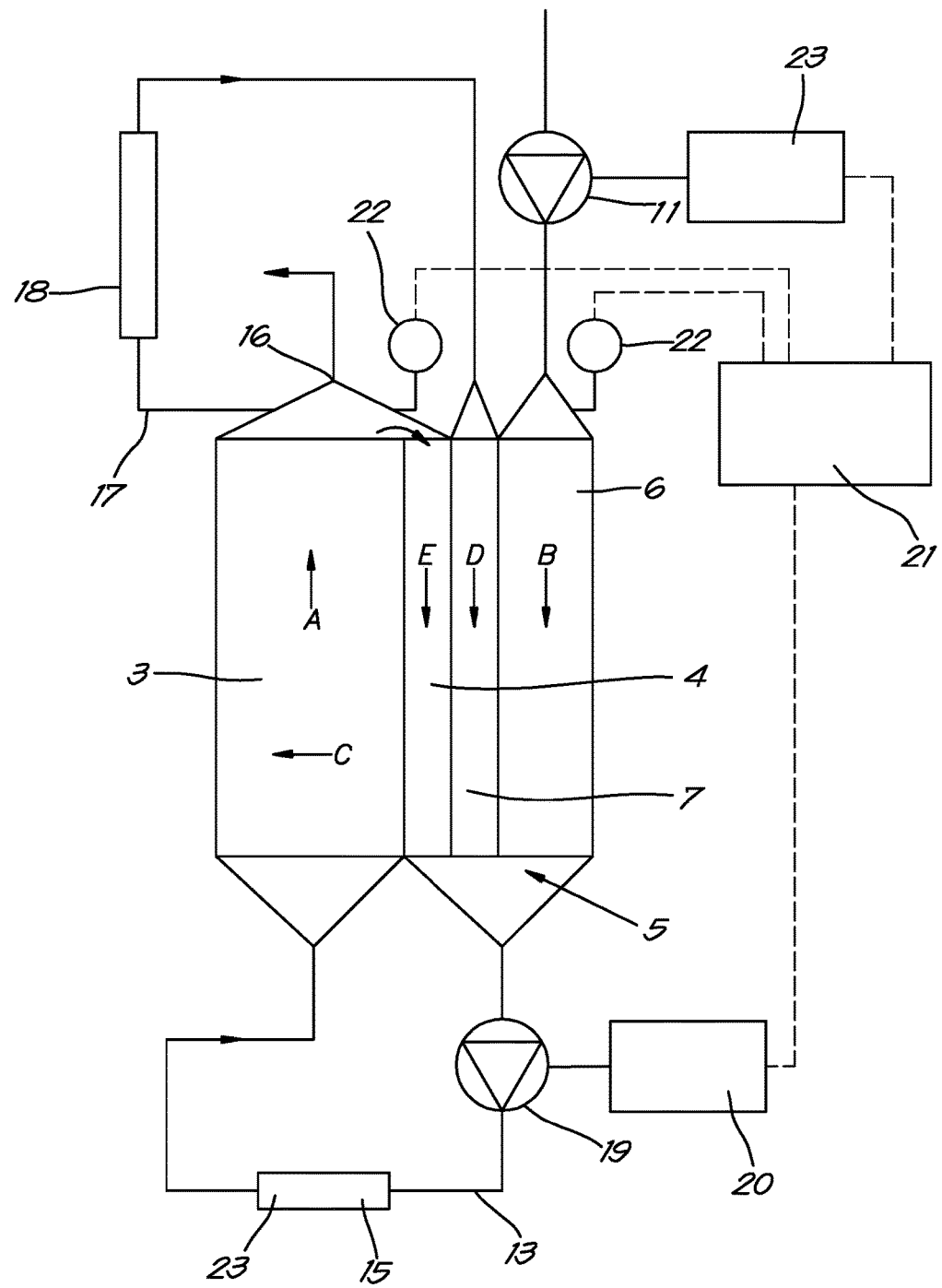
FIGS. 4 to 9 show variants of a compressor installation according to FIG. 2.

FIG. 4 shows a variant of a compressor installation according to FIG. 2 whereby the aforementioned blower 19 is provided with controllable drive means 20, for example in the form of a frequency controlled motor, and these drive means 20 are connected to a control system 21 (controller) to which one or more sensors 22 are connected to determine the pressure difference between the first outlet of the drying zone 3 on the one hand, and the first inlet of the first subzone 6 of the regeneration zone 5 on the other hand, and whereby the aforementioned control system 21 is provided with an algorithm, that changes the speed of the aforementioned drive means 20 on the basis of the aforementioned pressure difference.

In this example the compressor 11 is also provided with controllable drive means 23, which in this case, but not necessarily, are also connected to the aforementioned control system 21 for the control thereof.

When the pressure at the first inlet of the first subzone 6 is kept lower than the pressure at the outlet of the drying zone 3, it prevents leaks of moist gas to this drying zone 3 being able to occur.

The possibility is also provided to stop the blower 19 when the compressor 11 stops.

With such an embodiment shown in FIG. 4 the flow of the second regeneration flow can be controlled such that this flow can always be maintained.

Figure 5:
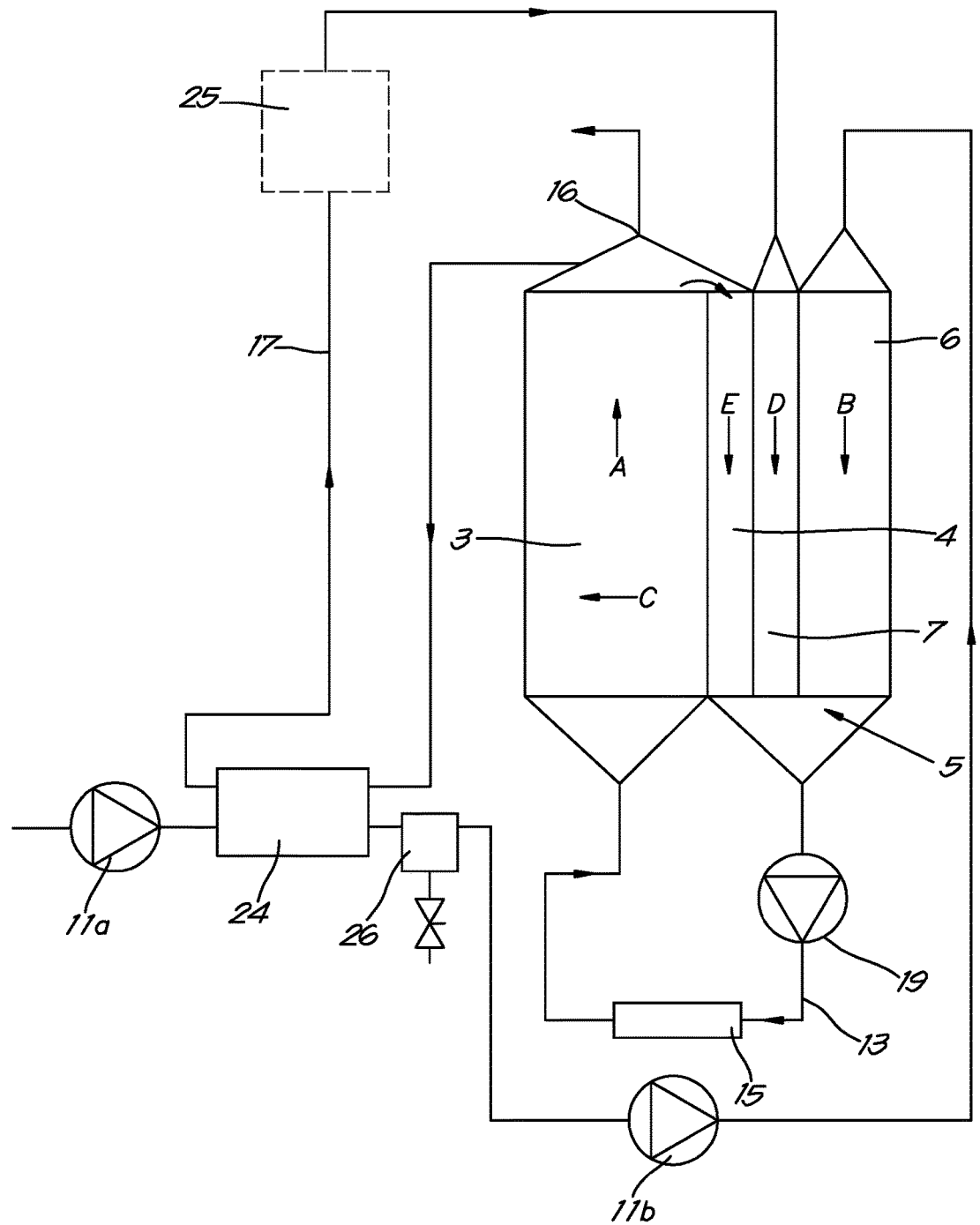

FIG. 5 shows another variant of a compressor installation according to FIG. 2, whereby in this case the heating element 18 comprises an intercooler 24 that is provided between two pressure stages 11a and 11b, immediately after one another or otherwise, of the compressor. If necessary a section of the heating element 18 can be provided in the tap-off pipe 17, for example in the form of a separate electric heating element 25.

In this example, a condensate separator 26 is provided between the intercooler 24 and the second pressure stage 11 of the compressor.

The operation of such an embodiment is practically analogous to that of FIG. 2. Here too the blower 19 will ensure that the flow of the second regeneration flow is guaranteed, while moreover undesired leaks from the first inlet of the first subzone 5 of the regeneration zone 5 to the first outlet of the drying zone 3 are prevented.

The most important additional advantage of this embodiment is that less energy has to be supplied to the heating element 25 because heat of compression from after the first pressure stage 11a is recovered.

If desired, a small additional cooler can be provided between the pressure stages 11a and 11b in order to always be able to realise sufficient intercooling of the compressed gas.

Figure 6:
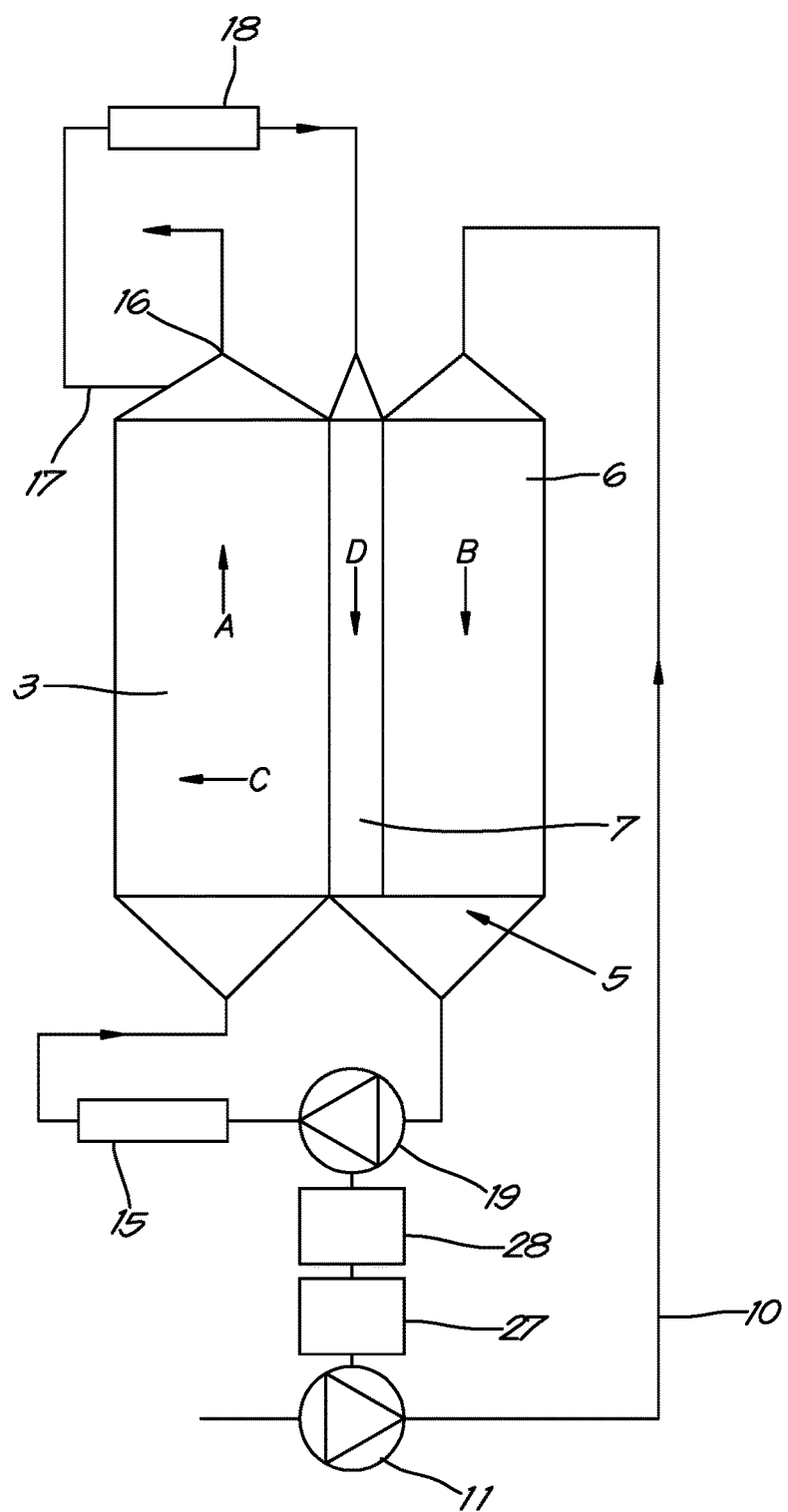

In the example shown in FIG. 6, the compressor 11 and the blower 19 are provided with a single drive, for example in the form of one electric motor 27 that drives the compressor 11 concerned and the blower 19 via a transmission 28 (for example gearwheels) or otherwise.

In this example the optional cooling zone is also omitted. The operation of this embodiment is the same as for the embodiments described above. The advantage of this embodiment is that only one drive has to be provided, such that costs can be saved in production, purchasing and maintenance and that the control can be simplified.

Figure 7:
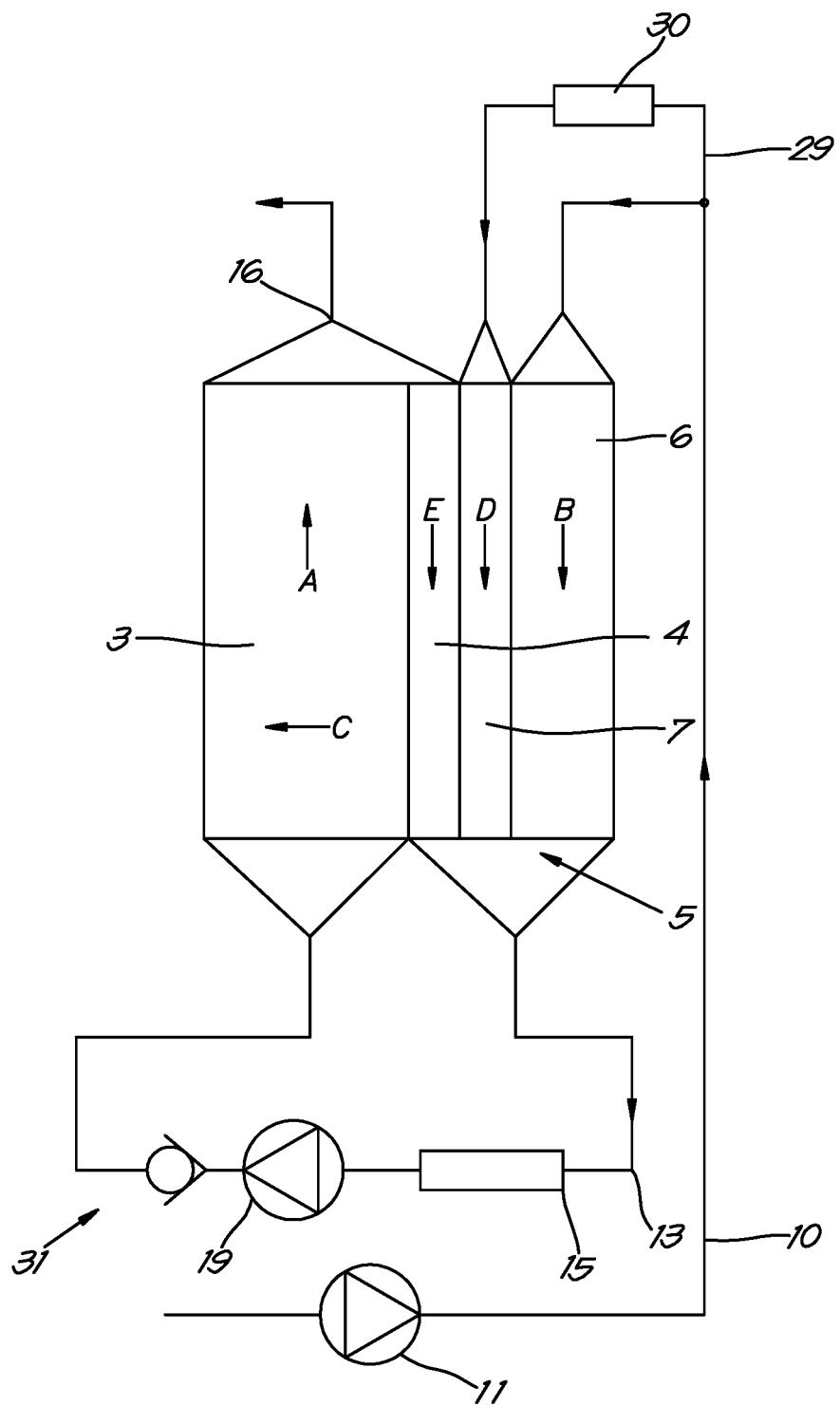

FIG. 7 shows another embodiment of a compressor installation that makes use of a method according to the invention for drying compressed gas, whereby in this case the second regeneration flow to the second subzone 7 of the regeneration zone 5 is tapped off from the pressure pipe downstream from the compressor 11, without first being driven through an aftercooler. In this example a heating element 30 is provided in the tap-off 29 provided to this end, in order to enable the relative humidity of the second regeneration flow to come out higher than that of the first regeneration flow. In this case the feedback of gas already dried from the outlet of the drying zone 3 is not necessary, but such can in any case be provided.

In this example restriction means 31 are provided in the connecting pipe 13 that prevent gas being able to flow from the drying zone 3 to the regeneration zone 5 via the connecting pipe 13. In one preferred embodiment the aforementioned restriction means 26 comprise a non-return valve that is affixed in this connecting pipe 13.

Broadly speaking, the operation of such a variant embodiment is analogous to that of the embodiments described above.

In a method according to the invention, the gas that is driven through the second subzone 7 does not necessarily originate from the dryer itself, but can also originate from an external source of dried gas. An external source may include air or other gasses or blends thereof, which undergo various means and methods of dew point suppression, including 'pressure swing', 'vacuum swing' and/or reduced temperature technologies (i.e. cool drying).

Figure 8:
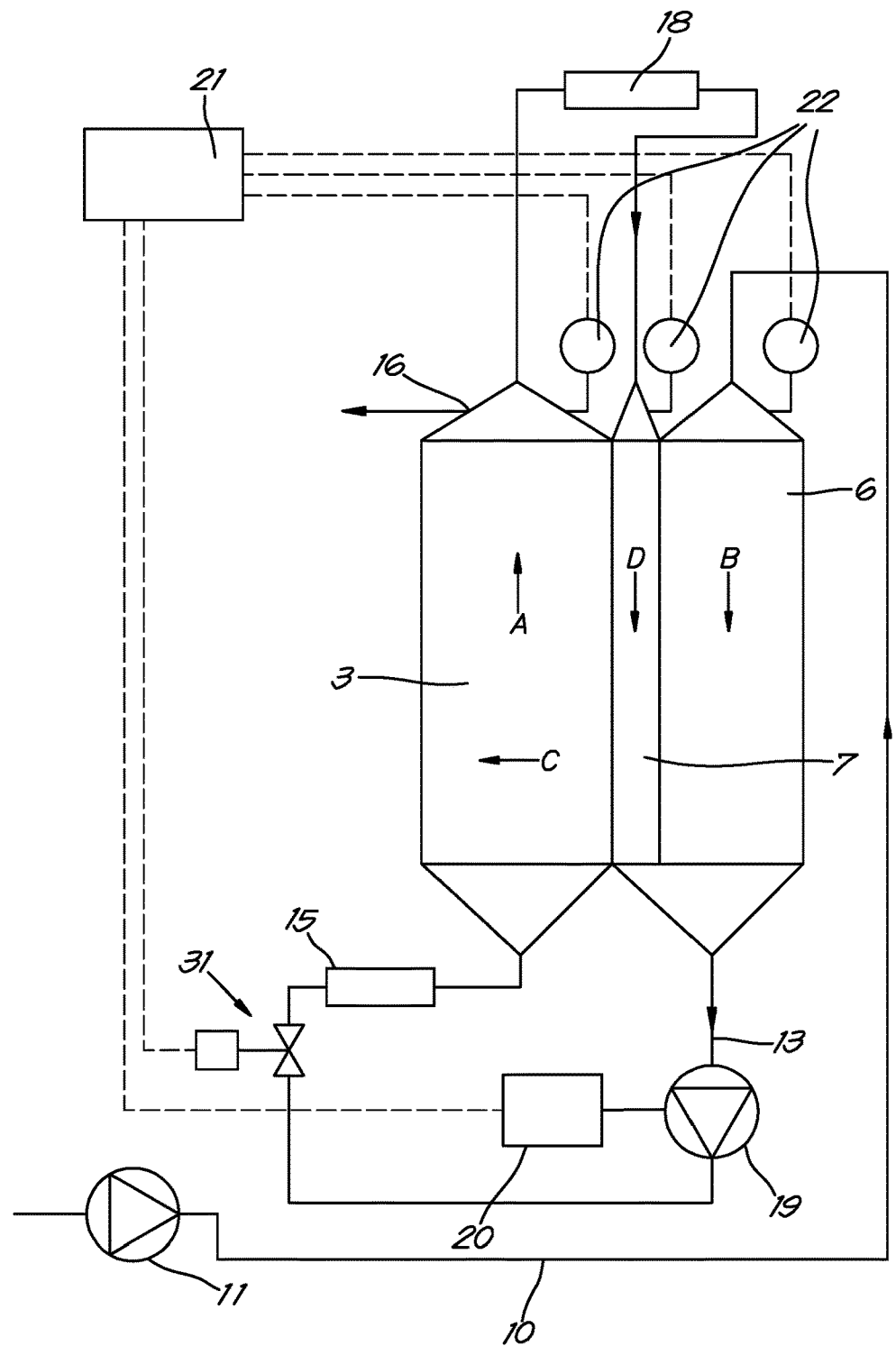

FIG. 8 shows another embodiment of a compressor installation according to the invention, whereby in this case the aforementioned restriction means 31 are constructed in the form of a controllable shut-off valve that is connected to the control system 21. In this example, not only is the first outlet of the drying zone 3 and the first inlet of the first subzone 6 provided with a sensor 22, but such a sensor 22 is also provided at the second inlet of the second subzone 7, for example in the form of pressure sensor that is also connected to the aforementioned control system 21.

By using three sensors 22 an optimum pressure balance between the different zones 3, 6 and 7 in the dryer can be maintained by responding to them, for example by controlling the speed of the blower 19. In this way undesired leakage losses, between zones 3, 6 and 7 mutually, can be prevented or it can be ensured that any leaks occur in a direction that minimally affects the efficiency of the dryer.

Figure 9:
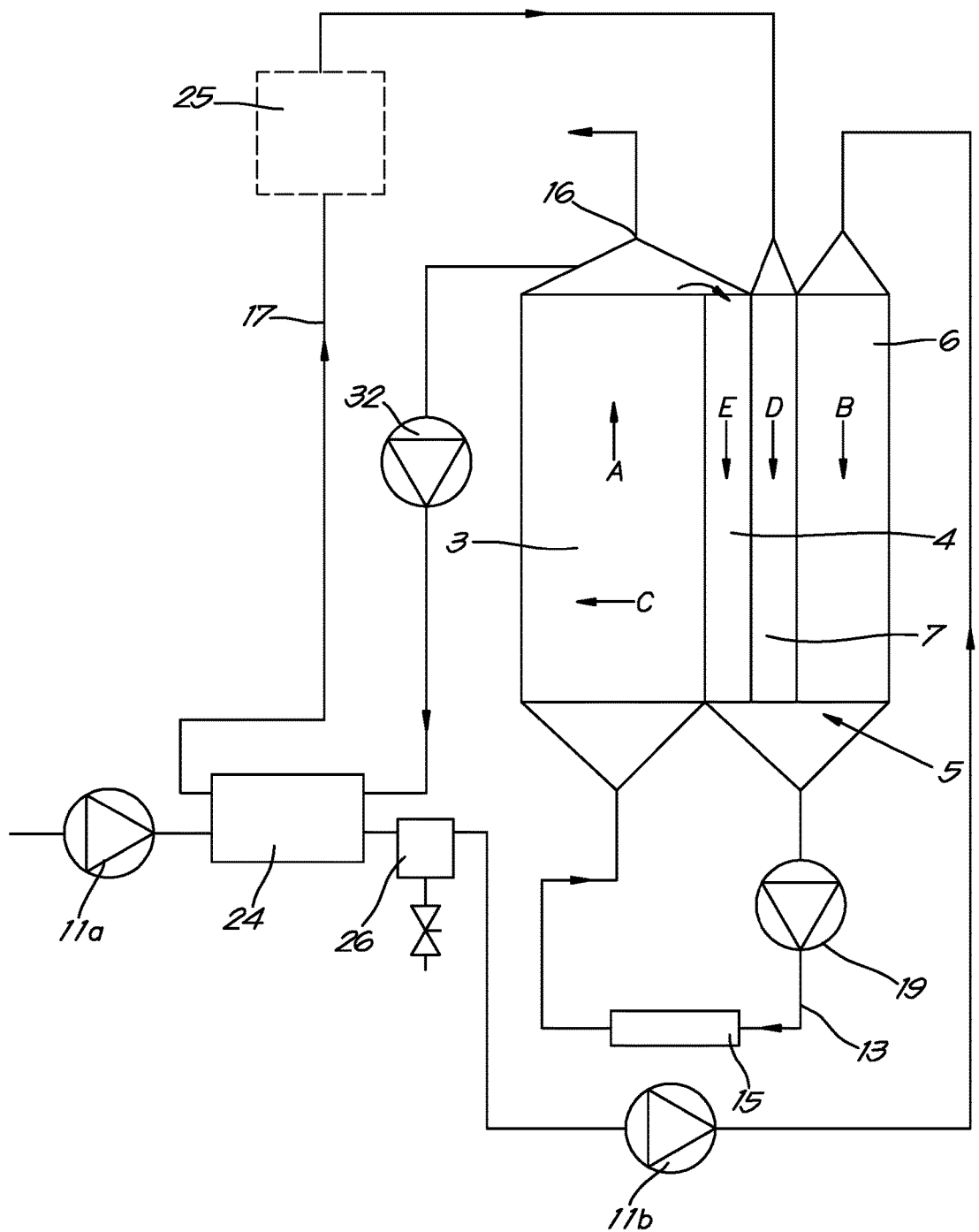

FIG. 9 shows another variant of a compressor installation according to FIG. 5, whereby in this case in the tap-off pipe 17 additional means, for example in the form of an extra blower 32 are provided for boosting the gas flow through this tap-off pipe 17. In this way the flow towards the second subzone 7 can be always be ensured, despite the pressure drop that might occur in the tap-off pipe 17 due to the intercooler 24 and the optional heating element 25.

According to the invention, such additional means could also be provided in the tap-off pipe 17 in embodiments wherein no use is made of heat recuperation in this tap-off pipe 17 by means of an intercooler 24.

According to a special characteristic of the invention, the dryer according to the invention does not comprise a venturi ejector.

The present invention is by no means limited to the embodiments described as an example and shown in the drawings, but a dryer and compressor installation according to the invention and a method according to the invention for drying compressed gas can be realised in all kinds of forms and dimensions and in different ways, without departing from the scope of the invention.

The invention claimed is:

1. A method for drying compressed gas, wherein the method comprises the following steps:

driving the entire warm compressed gas flow originating from a compressor as a first regeneration gas flow through a first subzone of a regeneration zone of a dryer that is provided with a vessel, with besides the regeneration zone, a drying zone therein, and a rotatable drum in the vessel with a regeneratable drying agent therein and drive means for rotating the drum such that the drying agent is moved successively through the drying zone and the regeneration zone;

cooling the gas flow output from the regeneration zone and separating condensate from the gas flow;

guiding the gas flow through the drying zone to dry the gas flow for use in further applications;

guiding a second regeneration flow through a second subzone of the regeneration zone, the second regeneration flow having a relative humidity that is lower than a relative humidity of the first regeneration flow.

2. The method according to claim 1, wherein the second regeneration flow consists of a portion of the dried gas, that is tapped off from a first outlet of the drying zone, that is fed back to a second inlet of the second subzone of the regeneration zone.

3. The method according to claim 2, wherein the tapped-off portion of dried gas is first heated before being guided to the second subzone of the regeneration zone.

4. The method according to claim 1, wherein the gas flow leaving the regeneration zone via a connecting pipe is subject to a pressure increase such that the pressure at the first outlet of the drying zone is higher than the pressure at a first inlet of the first subzone of the regeneration zone.

5. The method according to claim 1, wherein the second regeneration flow includes a portion of the dried gas that is tapped off from a first outlet of the drying zone and is fed back to a second inlet of the second subzone of the regeneration zone.

6. The method according to claim 5, wherein the tapped-off portion of dried gas is first heated before being guided to the second subzone of the regeneration zone.

7. The method according to claim 1, wherein a first end of a tap-off pipe is connected to a first outlet of the drying zone and second end of the tap-off pipe is connected to a second inlet of the second subzone such that the entire flow rate of gas to be dried is first guided through the regeneration zone before being guided through the drying zone.

8. The method according to claim 7, further comprising boosting said second generation flow from the drying zone through the tap-off pipe to the second subzone.

9. The method according to claim 8, wherein said second generation flow is boosted with a blower provided in a connecting pipe that connects the second outlet of the regeneration zone to the first inlet of the drying zone.

10. The method according to claim 8, wherein the first subzone of the regeneration zone is provided with a first inlet for the first regeneration flow and the second subzone is provided with a second inlet for the second regeneration flow and the regeneration zone is further provided with a second outlet for the regeneration zone flows from the first and second subzones.

11. The method according to claim 10, further comprising
determining a pressure difference between the first outlet of the drying zone and a second outlet of the regeneration zone, and
changing a speed of the rotating of the drum based on said pressure difference.

12. The method according to claim 11, wherein the second outlet of the regeneration zone is connected to the first inlet of the drying zone by a connecting pipe.

13. The method according to claim 12, further comprising cooling the gas that enters the connecting pipe with a cooler, wherein a condensate separator is provided in the cooler.

14. The method according to claim 13, further comprising
preventing, with a restrictor, gas from flowing from the drying zone to the regeneration zone via the connecting pipe.

15. The method according to claim 14, wherein the restrictor includes a non-return valve affixed in the connecting pipe or a controllable shutoff valve.

16. The method according to claim 3, wherein the tapped-off portion of the dried gas is first heated by a heating element in the tap-off pipe.

17. The method according to claim 16, wherein the heating element is controllable, and the method further comprises
measuring a temperature in the heating element with a temperature sensor, and
controlling the heating element based on the output from the temperature sensor.

18. The method according to claim 16, wherein the dryer is not provided with a venture ejector.

* * * * *